United States Patent [19]
Jones, Jr. et al.

[11] Patent Number: 5,155,643
[45] Date of Patent: Oct. 13, 1992

[54] UNSHIELDED HORIZONTAL MAGNETORESISTIVE HEAD AND METHOD OF FABRICATING SAME

[75] Inventors: Robert E. Jones, Jr., San Jose, Calif.; Mark H. Kryder, Bradford Woods, Pa.; Keith R. Mountfield, Pittsburgh, Pa.; Javier I. Guzman, Pittsburgh, Pa.

[73] Assignee: Mars Incorporated, McLean, Va.
[21] Appl. No.: 605,513
[22] Filed: Oct. 30, 1990
[51] Int. Cl.$^5$ .............................................. G11B 5/33
[52] U.S. Cl. ................................... 360/113; 235/449
[58] Field of Search ............ 360/113, 110; 338/32 R; 235/449

[56] References Cited

U.S. PATENT DOCUMENTS

| | | | |
|---|---|---|---|
| Re. 33,383 | 10/1990 | Lazzari | 156/643 |
| 4,465,925 | 8/1984 | Goi | 235/379 |
| 4,473,799 | 9/1984 | Favre | 324/226 |
| 4,487,306 | 12/1984 | Nao et al. | 194/4 |
| 4,523,330 | 6/1985 | Cain | 382/7 |
| 4,588,292 | 5/1986 | Collins | 356/71 |
| 4,628,194 | 12/1986 | Dobbins et al. | 235/379 |
| 4,723,072 | 2/1988 | Naruse | 235/454 |
| 4,737,649 | 4/1988 | Naruse | 250/562 |
| 4,749,087 | 6/1988 | Buttifant | 209/534 |
| 4,851,944 | 7/1989 | Mowry | 360/113 |
| 4,916,295 | 4/1990 | Chominski | 235/449 |
| 4,988,850 | 1/1991 | Masuda et al. | 360/113 X |

FOREIGN PATENT DOCUMENTS

| | | |
|---|---|---|
| 0097570 | 1/1984 | European Pat. Off. |
| 2909731 | 9/1979 | Fed. Rep. of Germany |
| 3802121 | 8/1989 | Fed. Rep. of Germany |
| 3921420 | 1/1990 | Fed. Rep. of Germany |
| 661603 | 7/1987 | Switzerland |
| 1481902 | 8/1977 | United Kingdom |

OTHER PUBLICATIONS

Chapman et al, "A New Horizontal M-R Head Stucture," IEEE Transactions on Magnetics, vol. 25, No. 5, Sep. 1989.
Chapman, "A New Approach To Making Thin Film Head-Slider Devices," IEEE Transactions on Magnetics, vol. 25, No. 5, Sep. 1989.
Indeck et al, "A Magnetoresistive Gradiometer," IEEE Transactions on Magnetics, vol. 24, No. 6, Nov. 1988.
Kelley et al, "High-Track-Density Coupled Film Magnetoresistive Head," IEEE Transactions on Magnetics, vol. Mag-17, No. 6, Nov. 1981.
O'Day, "Balanced Magnetic Head," IBM Technical Disclosure Bulletin, vol. 15, No. 9, Feb. 1973.
Lazzari et al, "A New Thin Film Head Generation IC Head," IEEE Transactions on Magnetics, vol. 25, No. 5, Sep. 1989.
Heim, "The Sensitivity Function for Shielded Magnetoresistive Heads by Conformal Mapping," IEEE Transactions on Magnetics, vol. Mag-19, No. 5, Sep. 1983.
Gill et al, "A Magnetoresistive Gradiometer for Detection of Perpendicularly Recorded Magnetic Transactions," Journal of Applied Physics, vol. 65, No. 1, Jan. 1, 1989.
Van Ooyen et al, "Magnetoresistance in Laminated NiFe Films," Journal of Applied Physics, vol. 53, No. 3, Part II, Mar. 1982.
Mallinson, "'Gradiometer Head' Pulse Shapes," IEEE Transactions on Magnetics, vol. 26, No. 2, Mar. 1990.
Kelley et al, "Dual Element Unshielded Hall Head," IEEE Transactions on Magnetics, vol. Mag-20, No. 5, Sep. 1984.
Pohm et al, "0.075, 1.25 and 2.0 μm Wide M-R Transducers," Journal of Magnetism and Magnetic Materials, vols. 54-57, Part III, Feb. 1986.
Jeffers, "High Density Magnetic Recording Head," Proceedings of the IEEE, vol. 74, No. 11, Nov. 1986.

*Primary Examiner*—John H. Wolff
*Attorney, Agent, or Firm*—Davis Hoxie Faithfull & Hapgood

[57] ABSTRACT

An unshielded horizontal magnetoresistive head for magnetic sensing and reading devices. The horizontal unshielded magnetoresistive head is comprised of two magnetoresistive elements separated by a gap and a conductive cross member which electrically connects the magnetoresistive elements together and to a common electrical point such as system ground. A differential voltage sensing circuit is connected across the magnetoresistive elements for sensing voltage variations when magnetic data is sensed by the head. The present invention further facilitates a more simplified fabrication process which results in cost savings and more efficient fabrication methods and procedures.

17 Claims, 5 Drawing Sheets

UNSHIELDED HORIZONTAL MAGNETORESISTIVE HEAD AND METHOD OF FABRICATING SAME

FIELD OF THE INVENTION

The present invention relates to an unshielded horizontal magnetoresistive head which may be utilized for magnetic sensing and reading. Further, the present invention relates to such heads which have cost and fabrication advantages over current heads, and the method of fabricating such heads. More particularly, the heads of the present invention may be utilized in a bill validator to sense the magnetic properties inherent in paper currency such as U.S. currency, or to many other applications involving magnetic sensing or reading which will be readily apparent to those skilled in the pertinent art in view of the following disclosure.

BACKGROUND OF THE INVENTION

A magnetoresistive head is a sensing or reading head which utilizes magnetoresistive elements to sense or read magnetic information inherent in a magnetic medium. A magnetoresistive element is one whose electrical resistance varies with varying incident magnetic fields.

Many prior art magnetic heads, for a great many applications including coin sensing, determining the contents of a coin tube, currency and bill validation, and determination of the denomination of paper currency or other forms of scrip, are of the inductive type which require a rapidly changing magnetic field in order for magnetic information to be detected and recorded. Magnetoresistive heads, on the other hand, are capable of detecting and reading information inherent in a slowly moving magnetic field. Prior art magnetoresistive heads are typically difficult to fabricate and consequently relatively expensive, as further discussed below.

The orientation of a sensing element of a magnetoresistive head may be either vertical or horizontal in relation to the magnetic medium which is being read. In the vertical orientation, described in R. S. Indeck, J. H. Judy, and S. Iwaski, "A Magnetoresistive Gradiometer," IEEE Trans. Magn. 24, 2617 (1988), the magnetoresistive head is situated on the magnetic medium in a vertical or standing up position which places the bottom edge of the head either in contact with or closely adjacent to or near, the magnetic medium which it is desired to read from.

A number of dual-element vertical magnetoresistive sensors have been described in the prior art literature for use with high performance reading. In general, these vertical structures have been comprised of two parallel magnetoresistive elements or sensors placed in close proximity to each other and standing perpendicular to the plane of the magnetic medium to be read. The advantages claimed for such structures include good common noise rejection, a broader range of linear performance (and consequently, a reduction of second-harmonic distortion), and a larger signal per unit width than with single sensor heads.

Vertical magnetoresistive heads are fabricated on a wafer, and then a strip containing a number of these heads arranged in a row is cut from the wafer. This cutting or separating process creates burrs or rough edges on the separated edges. The edge of this strip which contacts the magnetic medium must then be polished. This polishing step is critical because it determines sensor height. As tolerance is typically very tight, the process is an expensive one. The resulting polished strip is then diced to separate the individual heads.

Fabrication of horizontal magnetoresistive heads according to the present invention is much simpler than the above described vertical head fabrication method. In the present invention, once the wafer containing the head has been diced, it is the faces of the diced head elements, and not their side edges, that are to be used to either make contact with, or be placed closely adjacent to, the magnetic medium to be read. Hence, the present invention dispenses with the costly and time consuming polishing process.

While horizontal magnetoresistive heads are described in the prior art, such as by D. W. Chapman, D. E. Heim and M. L. William, "A New, Horizontal MR Head Structure," IEEE Trans. Magn. 25, 3689(1989) and D. W. Chapman, "A new approach to making thin film head-slider devices," IEEE Trans., Magn. 25,3686 (1989), these horizontal magnetoresistive heads employed a shield and the fabrication process employed to make them is premised around the inclusion of this shield. The present invention dispenses with such a shield and provides a horizontal magnetoresistive reading head which is unshielded. As a result, a simpler and less expensive fabrication process is employed to make unshielded horizontal heads according to the present invention. These heads have sufficient resolution to be highly desirable for use in a host of applications not previously recognized as appropriate for more expensive heads, and as a replacement for more expensive heads presently utilized in certain applications.

SUMMARY OF THE INVENTION

It is an object of the present invention to provide a horizontal, unshielded magnetoresistive reading head for use in magnetic sensing and reading devices and in other related devices to perform analysis or verification of the magnetic properties of certain magnetic media. This invention may find application in bill validators and the like where magnetic verification means are presently employed.

A new variety of dual magnetoresistive head is described in which the two magnetoresistive elements or sensors are situated in a common plane, either in contact with or adjacent to the magnetic medium to be read, in a horizontal configuration. Unlike prior art horizontal heads, the present horizontal head is unshielded.

Another object of the present invention is to provide a simplified design and fabrication process for magnetoresistive heads so that less expensive and more efficient fabrication procedures result.

The structure and method of use and fabrication of the present invention will be apparent to those skilled in the art from a review of the Detailed Description in conjunction with the drawings. Likewise, other objects of the present invention will be readily apparent to those skilled in the art.

DETAILED DESCRIPTION

Figure 1:
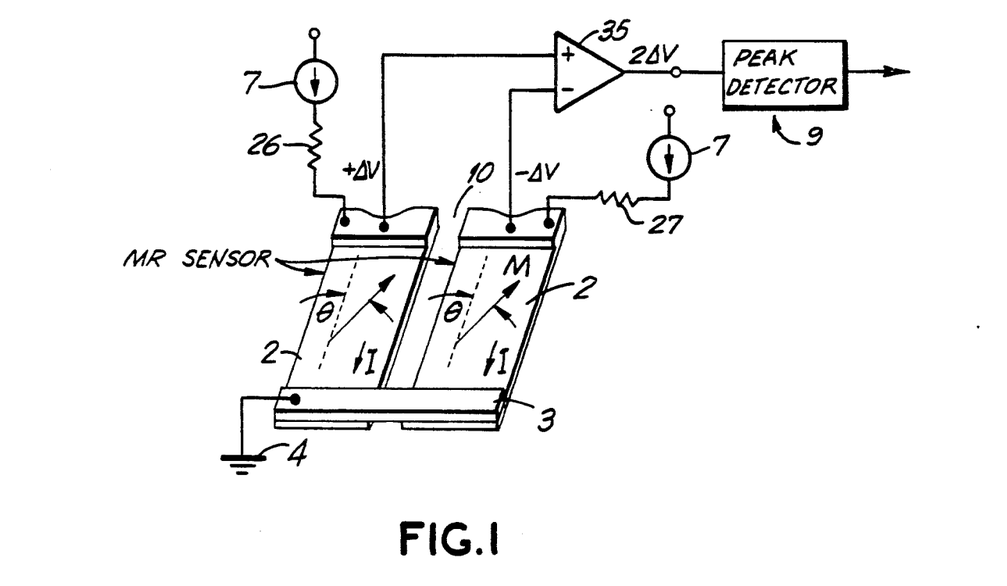
FIG. 1 depicts an unshielded horizontal magnetoresistive head according to the present invention.

Referring to FIG. 1, a simplified structural depiction of an unshielded horizontal magnetoresistive head 1 according to the present invention is shown. Two magnetoresistive strips 2 lie parallel to one another in the same horizontal plane, separated by a gap 10. The gap 10 may be filled with air or any other type of dielectric material, which is defined as an electrical insulator capable of sustaining an electrical or magnetic field with a minimum dissipation in power. The magnetoresistive strips 2 are connected at one end by a cross member element 3. Cross member element 3 is an electrical conductor and serves to structurally connect the magnetoresistive strips 2, as well as, to electrically connect them to a common electrical point 4 which is typically system ground. The ungrounded ends of each of the magnetoresistive strips 2 are connected through equal valued resistors 26 and 27 to a pair of constant current supplies 7. As a result, the ungrounded ends of each of the magnetoresistive strips 2 are also connected to the inputs of a differential voltage sensing device 35. Identical currents (I) flow from the constant current supplies 7 through the resistors 26 and 27, and then through each of the magnetoresistive strips 2 to ground. A peak detector circuit 9 is connected to the output of the differential voltage sensing circuit 35.

The strips 2 should be as thin as possible within practical design constraints so as to maximize the voltage change developed across each strip for a given magnetic transition or signal to be sensed thus achieving a higher degree of resolution. The size of the gap 10 is governed by the application to which the magnetoresistive head is employed. To obtain accurate results, the size of gap 10 should be such that no more than one magnetic transition appears within the gap 10 at any given instance in the sensing or reading process. For applications requiring a higher resolution, or where closely spaced magnetic transitions are found, a small gap size is necessary. In lower resolution applications, where the magnetic transitions are spaced farther apart, the size of the gap may be larger so long as multiple transitions do not occur within the gap at any given instance in time.

Magnetoresistive elements, by their nature, experience a change in electrical resistivity or resistance as a function of the orientation of the magnetic dipole moments that occur in the material, when a magnetic field is applied. Unlike inductive heads, magnetoresistive elements may operate to sense a slowly changing magnetic field.

Figure 5:
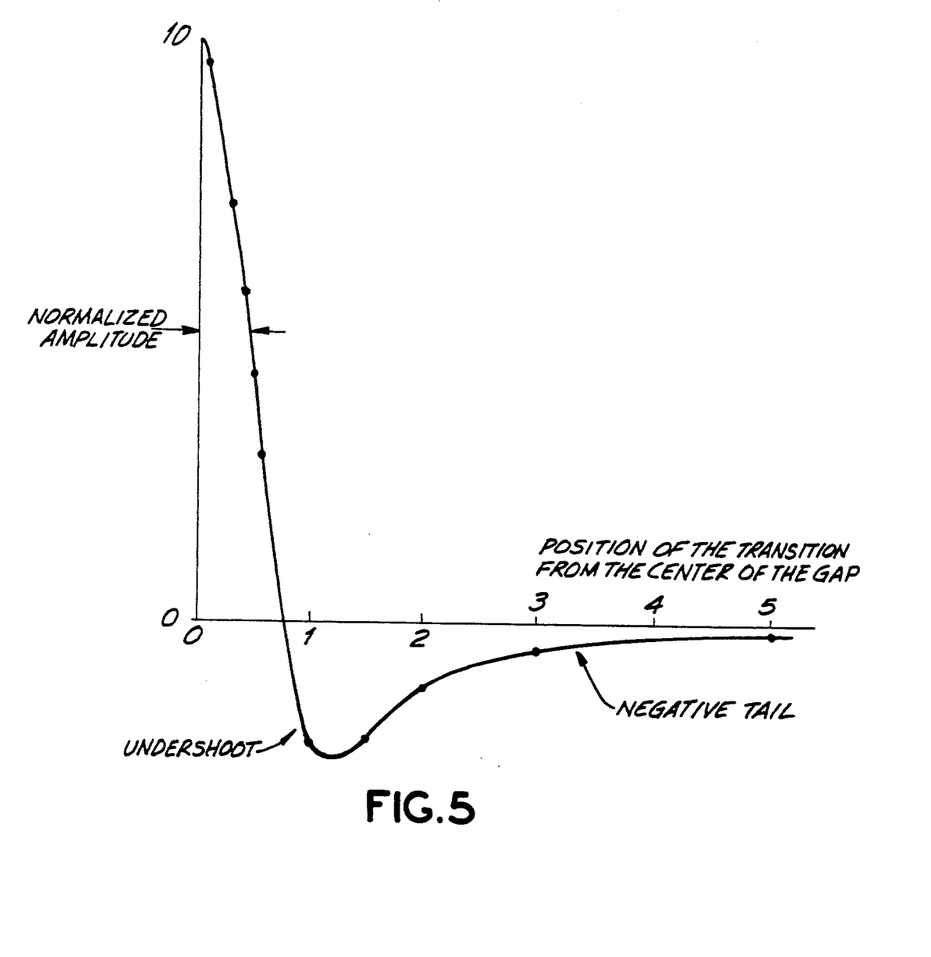
FIG. 5 is a graphical representation of an output signal from the unshielded horizontal magnetoresistive head of FIG. 1.
Figure 6:
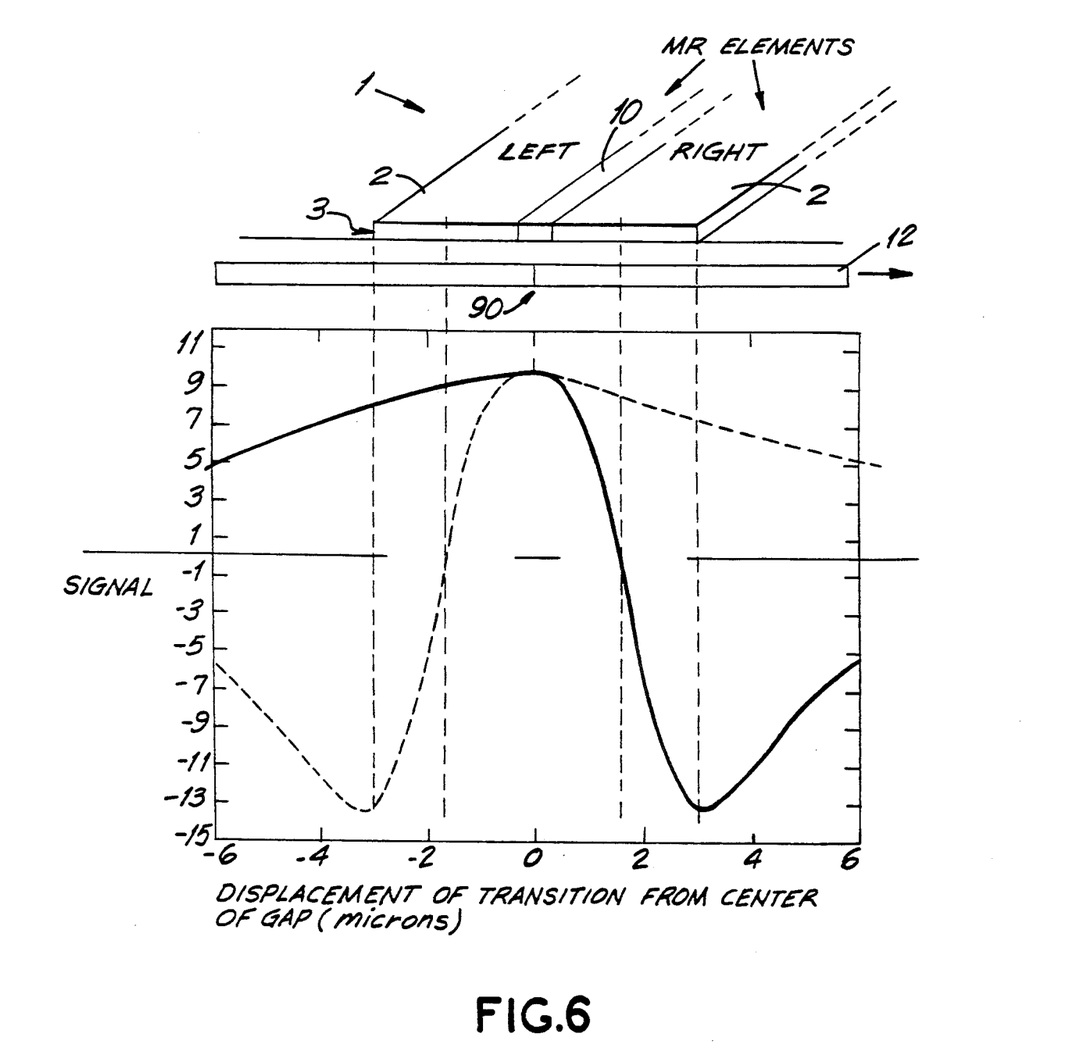
FIG. 6 is illustrative of the signals produced by each magnetoresistive strip of the magnetoresistive head of FIG. 1 as a magnetic transition is moved across the magnetoresistive head.

Referring once again to FIG. 1, the structure of the present invention consists of the two magnetoresistive strips 2 separated by the gap 10. The strips 2 have substantially the same electrical characteristics and substantially the same current (I) flowing in them. As a result, in the absence of a magnetic field, the voltage drop across each of the strips is substantially the same and the output of the differential voltage amplifier 35 is essentially 0 volts. When a magnetic field is applied proximate the strips so that they are not affected equally, the resistances of the two strips will vary, and with the currents passing through the strips 2 held constant by the constant current supplies 7 as shown in FIG. 1, the voltage drops across the strips 2 will vary. The typical signal obtained from this magnetoresistive head 1 is the difference in the variations in the voltages drops across the two magnetoresistive strips 2. The difference in the voltage drops of each magnetoresistive strip 2 is determined and is utilized by the magnetic sensing or reading system. As discussed further below, the maximum difference occurs as illustrated in FIGS. 5 and 6 when a magnetic transition is centered in the gap 10.

The change in the resistance of the magnetoresistive strips 2 is also a function of the orientation of the magnetic dipole moments inherent to the material of the strips 2. In order to provide a linear response and to maximize sensitivity, it is necessary to transversely bias the dipole moments of the strips 2 so as to uniformly orient them away from the easy axis. The easy axis is defined as the intrinsic orientation of the magnetic dipole moments of a material with no external magnetic or biasing field applied. The orientation of the dipoles after biasing is typically 45 degrees away from the direction of the flow of current (I). Any change in this angle of orientation, caused by the application of a magnetic field, will result in a change in the resistivity or resistance of the magnetoresistive strips 2.

In magnetoresistive material, the resistance of the material differs depending on the direction of its measurement in relation to the orientation of magnetization of the dipoles. Resistivity measured parallel to the orientation of the dipole magnetization will differ from resistivity measured perpendicular to the orientation of the dipole magnetization. This difference in resistance is $\Delta R$. $\Delta R$ is an intrinsic property of the material. In a zero transverse magnetic field, $\Delta R$ is at its maximum value. The resistance R is the resistance of the magnetoresistive element in a zero transverse field.

Figure 3:
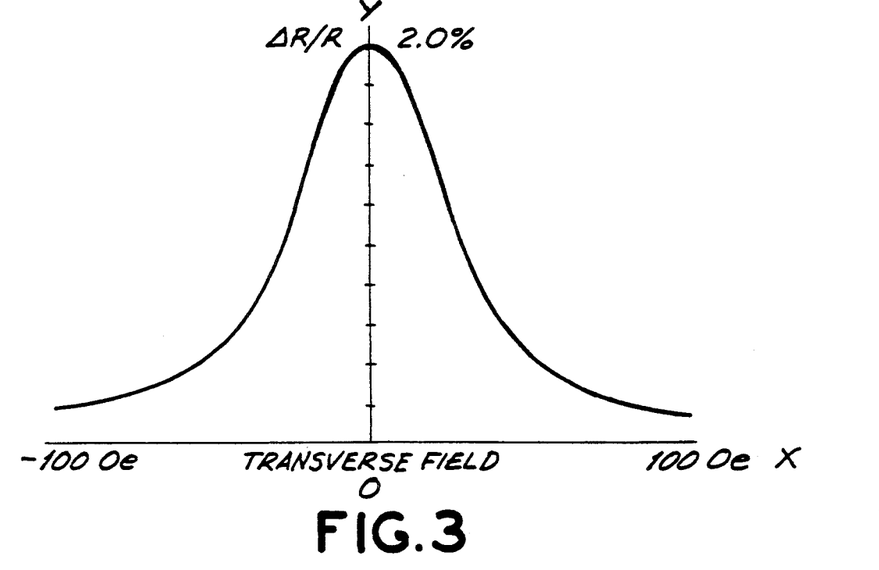
FIG. 3 is an illustration of a magnetoresistive response curve for a strip of magnetoresistive material before it is biased in the transverse direction.
Figure 4:
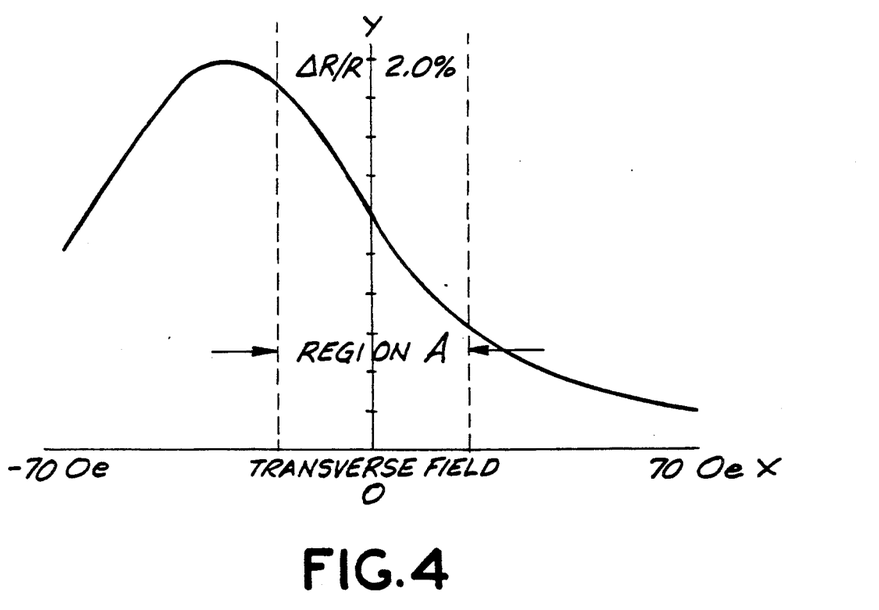
FIG. 4 is a magnetoresistive response curve for a given strip of magnetoresistive material after it has been biased in the transverse direction.

The magnetoresistive response curve, which is the ratio of $\Delta R$ to R plotted against the transverse magnetic field which is applied to the magnetoresistive element, is shown in FIG. 3. The bell shaped curve of FIG. 3 experiences a rapid drop off from its peak and then slowly approaches the horizontal axis. A linear relationship of these two parameters is desired for magnetic sensing and reading applications. As a result of the biasing of the dipoles of the magnetoresistive strips 2, the curve of FIG. 3 may be shifted to the left. FIG. 4 is illustrative of this curve shifted due to biasing of the dipoles, and it should be noted that the X-axis of FIG. 4 is not drawn to scale with the X-axis of FIG. 3. The biasing of the strips 2 causes a more linear portion of the response curve to be centered about the Y-axis of FIG. 4, designated region A, which is the typical region of operation for the magnetoresistive head. The magnetoresistive strips 2 are now placed into a linear operating region (region A) which results in maximum sensitivity and in the linearization of the magnetoresistive head's operation. Therefore, a more accurate and sensitive device is achieved.

An auxiliary structure (not shown) is preferably provided to properly bias the strips 2 so as to orient the magnetic dipoles in the manner just described. The magnetic dipole orientation angle $\theta$ (theta) is illustrated in FIG. 1. The auxiliary biasing structure might be, for example, adjacent soft magnetic layers deposited over the magnetoresistive strips 2.

The device of the present invention is capable of outputting large signals with high resolution. For example, if each of the strips 2 are 1 micron wide, and are separated by a gap of 0.2 microns, then the signal peak is only 0.9 um wide at half amplitude (flying height, or the distance of the head from the magnetic medium to be read from, is equal to 0.25 microns). Such fine lines and spacings are within the current state-of-the-art fabrication of microelectronic devices, particularly where the strips 2 are defined on a flat, featureless surface.

The fabrication of magnetoresistive heads requires high resolution patterning of these elements in a manner similar to the patterning of electrical transistors. This patterning operation comprises several masking steps. Magnetoresistive heads are "built up" using successive layers of different materials which have been patterned into different geometries. In prior art shielded magnetoresistive heads, patterning is required to be performed on the shield as well as on the magnetoresistive element. Also, alignment between the shield and the magnetoresistive strips is especially critical, and, therefore, the masking steps utilized in the patterning of the devices is particularly of great importance.

Figure 2:
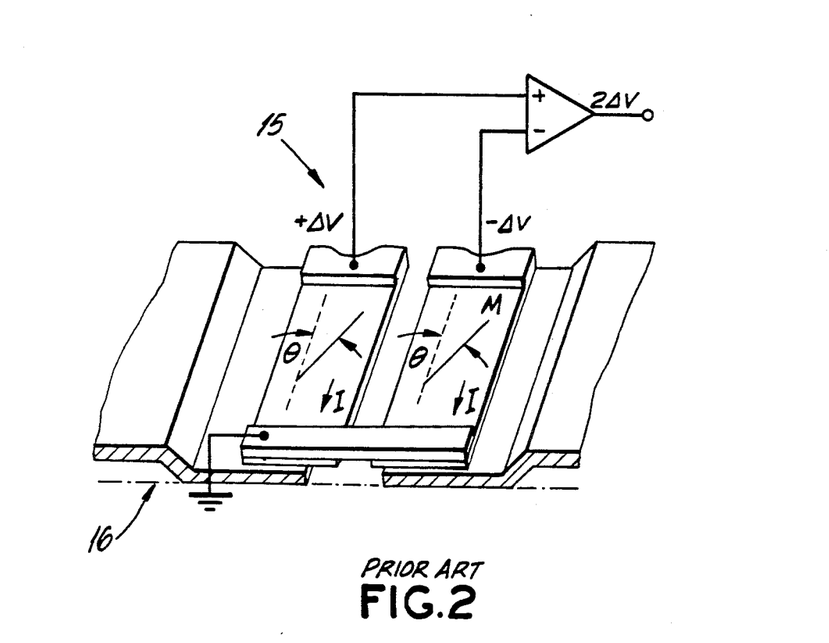
FIG. 2 illustrates a prior art shielded horizontal magnetoresistive head.

It can be seen that the configuration of the present invention depicted in FIG. 1 is simplified in comparison to that of the prior art depicted in FIG. 2. FIG. 2 illustrates a prior art shielded horizontal magnetoresistive head 15 showing a magnetic layer 16 which serves as a shield.

The structure of the present invention differs from the prior art in that there is no shield. Prior art devices used solely in high resolution applications utilized magnetic shields to block electromagnetic signals emanating from sources in the environment other than the magnetic medium to be sensed or read. These stray electromagnetic signals might be detected by the magnetoresistive head resulting in inaccurate indications of the magnetic field detected from the magnetic medium. Such sources of inaccuracy were alleviated in these high resolution magnetoresistive head applications by the use of a shield.

The present invention recognizes that horizontal magnetoresistive heads formerly used in high resolution applications would be suitable to low resolution applications if they could be manufactured more simply and less expensively. The present invention recognizes that in low resolution applications any stray electromagnetic flux will not substantially affect the measurement. Consequently, the shield is eliminated in the present invention and the simplified fabrication process of the present invention provides for more than adequate resolution in a great many applications and further allows for a device which is much simpler and less costly to fabricate.

The unshielded magnetoresistive head of the present invention eliminates one high resolution patterning fabrication operation because the shield element is eliminated. The ability to disregard the shield shortens the number of steps required to fabricate the type of sensing or reading head of the present invention.

The present invention also provides for a better surface on which to pattern the sensors. A prior art device required forming the sensors over an aperture in a shield structure. The surface over this aperture is not easily made flat and smooth to facilitate formation of the magnetoresistive strip sensor pattern. Consequently, added time and expense was needed to rectify this situation presented by the prior art. The need to very accurately position the sensors over the aperture is also not required by the present invention. Hence, the present invention provides for an improved fabrication process and still provides for the degree of resolution necessary to perform a great number of desired tasks.

Some prior art magnetoresistive head devices required the fabrication of two magnetoresistive films and an intervening non-magnetic layer. According to the present invention, both magnetoresistive strips 2 are formed in the same lithography operation and from the same deposited magnetoresistive film. This provides for yet another fabrication advantage over the prior art.

Further, the two magnetoresistive films resulting from the prior art vertical magnetoresistive head fabrication processes are unlikely to be identical because they are formed from separate films. In horizontal magnetoresistive head fabrication, the magnetoresistive strips 2 may be formed from the same layer of material and hence, a more closely identical pair of strips may be obtained. Consequently, there is a reduction in the number of film layers required to form the horizontal magnetoresistive strips 2. Also, because a horizontal structure is being made, there is no need for additional steps relating to producing precise sensor widths required when fabricating vertical devices. Hence, numerous fabrication steps and problems are eliminated by the present invention which result in inexpensive and simpler fabrication procedures.

Output signal "undershoots" are another area of concern in magnetoresistive heads. An output signal undershoot and its associated negative tail are illustrated in FIG. 5 which shows the normalized amplitude of the magnetoresistive head plotted against the position of the magnetic transition of the material being sensed or read from the center of the gap 10 of FIG. 1. An output signal undershoot and its associated negative tail results from the subtraction of the voltage signals produced across each magnetoresistive strip 2.

FIG. 6 depicts the magnetoresistive head 1 of the present invention showing the individual magnetoresistive strips 2 and the resulting graph of the signals generated by each strip. A magnetic medium 12 is passed under the head such that the magnetic transition 90 moves from left to right as shown. The signal represented by the broken line is produced by the left strip 2 as the magnetic transition 90 passes from left to right, while the solid line represents the negative of the signal produced by the right element strip 2 as the magnetic transition 90 continues to move from left to right. It is the sum of these signals produced by the two strips which results in the output signal of the head shown in FIG. 5.

In FIG. 6, note that the signal from an individual strip 2 crosses zero on the graph at, and is symmetrical about, the centerline of the individual strip 2. The signal in the right strip 2, for example, is maximally positive when the transition is on the left edge, and maximally negative when the transition is on the right edge, and zero when the transition is in the center of the strip 2. As the transition 90 moves away from the strip 2, the signal drops off because the magnetic field is strongest when the transition is nearest to the strip. Both of the signals of FIG. 6 are added by the differential voltage sensing circuitry 35 of FIG. 1. The sum of the signals is the output signal of the magnetoresistive head which is depicted in FIG. 5.

The undershoots in the device signal occur because the negative peak at strip 2 is much stronger than the positive signal produced in the farther strip 2. Hence, there will always be undershoot in these magnetoresistive heads.

These undershoots are undesirable because the reading circuitry, which accompanies the device of the present invention, incorporates a peak signal detector 9 (shown in FIG. 1) for the further processing of the output signal. The circuitry is prone to detecting negative peaks as well as positive peaks and, therefore, it can be seen that the existence of undershoots can present an important problem as the undershoot may be detected rather than the actual positive peak.

The output signal undershoots of the present invention are larger than those characteristic of the shielded version of the horizontal magnetoresistive head. While the unshielded horizontal magnetoresistive head may have a larger magnitude of negative undershoot than the shielded heads, similar undershoots are also a feature of the thin film inductive head's output, particularly when the head flies close to a thin magnetic medium. Even with this drawback, however, inductive heads have been practical for over ten years. Similarly, the undershoots experienced in the present invention present no insurmountable obstacle, especially since signal processing techniques, known in the field, may be utilized to correct for their occurrences.

Signal processing circuitry is employed in the peak detector 9 of FIG. 1 to detect and reject undesirable undershoots. This circuitry must be designed specifically for each output signal characteristic. In principle, any "x-y" two-dimensional detection scheme which (1) looks for a peak and (2) checks that its height is above a specified minimum, can be employed to detect and reject these undershoots. Hence, the large undershoots of the present invention present no serious problems to the unshielded horizontal magnetoresistive head of the present invention.

Further, the cost and fabrication advantages of the present invention far outweigh any cost or fabrication problems which may result in designing and constructing circuitry to reject the aforementioned undershoots.

Figure 7:
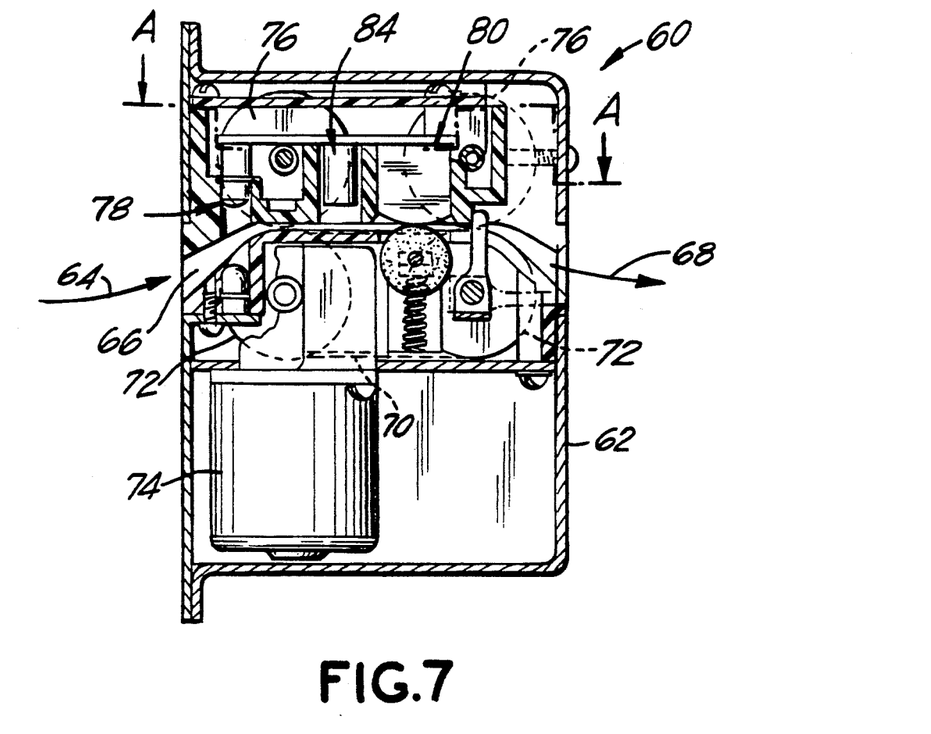
FIGS. 7 and 8 are illustrative of the utilization of the magnetoresistive head of FIG. 1 to detect magnetic transitions in currency in a currency validator.
Figure 8:
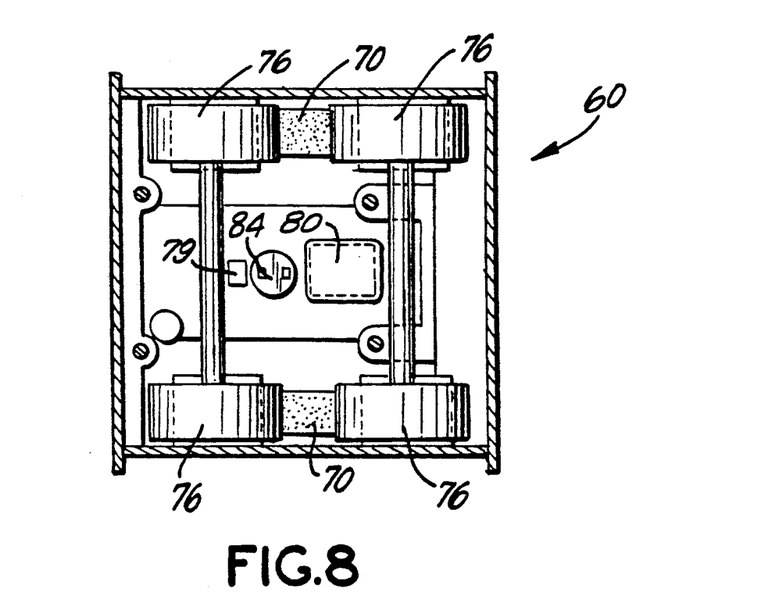

It is contemplated that the present invention may be used in a currency validator as one of a plurality of sensors positioned to encounter a banknote and generate electrical signals in response to certain features of the banknote. FIG. 7 depicts a currency validator 60 having a housing 62 containing a banknote passageway 64 having an entry 66 and an exit 68. Tractor belts 70 are supported by parallel rollers 72 and 76 which are operably connected to a motor 74. The motor controlled belts 70 act to advance a banknote or other magnetic media past a transmissive sensor 78, a reflective sensor 84, and a magnetic sensor 80. In a preferred embodiment of the present invention, the magnetic sensor 80 is an unshielded horizontal magnetoresistive sensor which generates an electrical signal in response to magnetic information on the surface of a banknote fed immediately beneath the sensor.

A permanent magnet 79 is located above the passageway between the entry 66 and the magnetoresistive sensor 80. The magnet 79 enhances the magnetic transition data on the banknote so that the signal produced by the magnetoresistive sensor 80 is also enhanced, thereby ensuring accurate detection of magnetic information on the banknote.

While the present invention has been described in one preferred embodiment in conjunction with its use in a currency validator, it is also envisioned that modifications may easily be made to the present invention so as to allow its employment in applications such as in coin sensing, coin tube content determination, card readers, as a substitute for widely used Hall effect sensors, and in other applications which are, or may become, known to those skilled in the art. Further, the present invention may be utilized in conjunction with a fixed magnet or other external magnetic field generating device.

In short, the present invention may be employed in any relatively low resolution magnetic sensing and reading application, with attendant cost and fabrication advantages.

The description of the preferred embodiment of the present invention is meant to be merely illustrative of the present invention and is not to be construed as a limitation thereof. Therefore, the present invention covers all modifications, changes, and alternatives in its design, methods of fabrication, and method of use falling within the scope of the principles taught herein.

We claim:

1. A horizontal magnetoresistive head for the sensing or reading of magnetic data comprising:
   dual strips of unshielded magnetoresistive material separated by a gap;
   a conductive cross member connected at one end of each of the dual strips to operatively connect the unshielded dual strips together and to a common electrical point; and
   a differential voltage sensing circuit connected to the unshielded dual strips to sense variations in the voltage between the two strips when magnetic data is sensed by the head and to generate signals in response to the variations.

2. The apparatus of claim 1, further comprising signal processing circuitry including a peak signal detector connected to the differential voltage sensing circuit for detecting and rejecting signal undershoots.

3. The apparatus of claim 1, further comprising a pair of constant current sources each of which is connected through a resistor to one of the dual strips.

4. The apparatus of claim 1, wherein the common electrical point is system ground.

5. The apparatus of claim 1, wherein the differential voltage sensing circuit is a differential amplifier.

6. The apparatus of claim 1 wherein the differential voltage sensing circuit is an operational amplifier.

7. The apparatus of claim 1, wherein the gap is comprised of dielectric material.

8. A method of fabrication of a horizontal magnetoresistive sensor which comprises the steps of:
   patterning two unshielded magnetoresistive strips having first and second ends in the same horizontal plane, from the same magnetoresistive film, in the same lithographic process, and separated by a gap of dielectric material;
   connecting the first end of each unshielded magnetoresistive strip to a common electrical point; and connecting the second end of each unshielded magnetoresistive strip to a differential voltage sensing circuit.

9. The method of claim 8, further comprising: transversely biasing the dipole moments inherent in the material of the magnetoresistive strips to orient them away from the easy axis to provide a linear response and thus to maximize the sensitivity and accuracy of the sensor.

10. The method of claim 8, wherein the dipole moments are oriented forty-five degrees away from the direction of the current flow in the unshielded magnetoresistive strips.

11. The method of claim 8, wherein the size of the gap is chosen so that no more than one magnetic transition appears within the gap during the sensing or reading process.

12. A method for sensing magnetic transition data using an unshielded horizontal magnetoresistive sensor having two magnetoresistive strips separated by a gap of dielectric material, comprising the steps of:

supplying constant and equal current to each magnetoresistive strip;

transporting material containing magnetic data past the unshielded magnetoresistive sensor;

monitoring the variations in the voltage drops across the unshielded magnetoresistive strips as the material moves past; and generating a signal corresponding to the magnetic data.

13. The method of claim 12, wherein the generated signal corresponding to the magnetic transitions is used to validate or denominate a banknote.

14. A horizontal magnetoresistive sensor apparatus for use in a currency validator to sense magnetic data from banknotes, comprising:

two strips of unshielded magnetoresistive material in a side by side orientation separated by a gap composed of dielectric material, wherein each strip has a first and a second end;

a conductive cross member connected to the first end of each strip of the unshielded magnetoresistive material, and connected to a common electrical point; and a differential voltage sensing circuit connected to the second end of each strip of the unshielded magnetoresistive material, for sensing voltage variations in the strips as magnetic data from a banknote being tested moves past the strips, and for generating signals in response to the variations.

15. The apparatus of claim 14, further comprising:

signal processing circuitry connected to the differential voltage sensing circuit for processing the generated signals.

16. The apparatus of claim 15, wherein the signal processing circuitry comprises a peak detector circuit for detecting and rejecting signal undershoots.

17. The apparatus of claim 14, further comprising:

a first and a second constant current source, each supplying equal current, wherein the first current source is connected through a first resistor to one of the unshielded magnetoresistive strips, and the second current source is connected through a second resistor to the other unshielded magnetoresistive strip.

* * * * *

UNITED STATES PATENT AND TRADEMARK OFFICE
CERTIFICATE OF CORRECTION

PATENT NO. : 5,155,643
DATED : October 13, 1992
INVENTOR(S) : Jones, Jr. et al

It is certified that error appears in the above-indentified patent and that said Letters Patent is hereby corrected as shown below:

Claim 6, column 8, line 55 insert --,-- following "1".

Claim 10, column 9, line 9 delete "8' and insert --9--.

Signed and Sealed this

Twenty-sixth Day of October, 1993

Attest:

BRUCE LEHMAN

*Attesting Officer*       *Commissioner of Patents and Trademarks*